(12) United States Patent
Schwartz et al.

(10) Patent No.: US 6,190,549 B1
(45) Date of Patent: *Feb. 20, 2001

(54) OXYGENATED WATER COOLER

(75) Inventors: Henry Schwartz, Kings Point; Dennis E. Crowley, Adams; Jason Ritton, Schenevus; George P. Mravlja, Jr., Worcester; R. Glenn Wright, Aurora; Doug Mowers, Worcester, all of NY (US)

(73) Assignee: Oxygen8, Inc., Jamaica, NY (US)

( * ) Notice: Under 35 U.S.C. 154(b), the term of this patent shall be extended for 0 days.

This patent is subject to a terminal disclaimer.

(21) Appl. No.: 09/267,037

(22) Filed: Mar. 12, 1999

Related U.S. Application Data

(60) Continuation-in-part of application No. 09/124,490, filed on Jul. 29, 1998, now Pat. No. 6,017,447, which is a division of application No. 08/878,609, filed on Jun. 19, 1997, now Pat. No. 5,868,944.

(51) Int. Cl.[7] ........................................... C02F 1/00
(52) U.S. Cl. ..................... 210/198.1; 222/146.6
(58) Field of Search ................ 210/192, 198.1; 222/146.6

(56) References Cited

U.S. PATENT DOCUMENTS

| | | |
|---|---|---|
| 4,219,424 | 8/1980 | Tamura et al. . |
| 4,765,807 | 8/1988 | Henriksen . |
| 5,006,352 | 4/1991 | Zelenak Zoltai et al. . |
| 5,108,590 | 4/1992 | DiSanto . |
| 5,295,519 | 3/1994 | Baker et al. . |
| 5,531,908 | 7/1996 | Matsumoto et al. . |
| 5,540,355 | 7/1996 | Hancock et al. . |
| 5,647,416 | 7/1997 | Desrosiers et al. . |
| 5,699,669 | 12/1997 | Gebhard . |
| 5,824,243 | 10/1998 | Contreras . |
| 6,017,447 * | 1/2000 | Wright et al. ................... 210/192 |

FOREIGN PATENT DOCUMENTS

WO 95/29130   11/1995   (WO) .

* cited by examiner

Primary Examiner—David A. Simmons
Assistant Examiner—Betsey Morrison Hoey
(74) Attorney, Agent, or Firm—Schmeiser, Olsen & Watts

(57) ABSTRACT

An oxygenated water cooler and method of operating the same for dispensing oxygen enriched water from a water bottle installed on the cooler. An pressurized gas source integrated into the cooler delivers pressurized gas through the water to a headspace above the water in the water bottle to maintain the dissolved oxygen content of water in the water bottle preferably above about 15 mg/liter, but optimally above about 40 mg/liter.

17 Claims, 2 Drawing Sheets

OXYGENATED WATER COOLER

The present patent application is a continuation-in-part of U.S. patent application Ser. No.: 09/124,490, filed Jul. 29, 1998, and entitled "Oxygenated Water Cooler," now U.S. Pat. No. 6,017,447, issued Jan. 25, 2000, which is a divisional of U.S. Pat. No. 08/878,609-Jun. 19, 1997, now 5,868,944, issued Feb. 9, 1999. The present patent application is related to copending U.S. patent application Ser. No.: 09/181,799, filed Oct. 28, 1998, and entitled "Oxygenated Water Cooler."

BACKGROUND OF THE INVENTION

The present invention relates to the art of coolers for dispensing fluids such as drinking water, and more particularly to a new and improved water cooler for dispensing oxygen enriched water.

Oxygen enriched drinking water has an enhanced taste appeal and offers the health and fitness conscious consumer an alternative and supplemental source of oxygen that is absorbed through the stomach. The term drinking water is intended to include, without limitation, spring water, filtered water, water treated by the reverse osmosis process, etc.

The dissolved oxygen content of natural pure spring water ranges from between about 5 mg/liter to 9 mg/liter depending on the source of the water, purification and processing techniques applied prior to bottling, and other factors. The water can be supersaturated with oxygen by injecting molecular oxygen into a water pipeline controlled at a pressure of 40–90 PSIG (pounds per square inch gage), or using other known methods. Using this technique, the dissolved oxygen level of the water can be increased to about 80 mg/liter. If bottled immediately in hermetically sealed bulk glass bottles or other suitable containers, the water will maintain the elevated dissolved oxygen level indefinitely.

Bulk water bottles typically are in the 3–5 gallon range. Upon opening a bulk water bottle containing water that is supersaturated with oxygen, and installing the water bottle on a standard water cooler, the dissolved oxygen in the water decreases to near the baseline level of about 5–9 mg/liter within about 3–5 days. Since the average time required to consume a 3–5 gallon bulk water bottle typically is in the 10–14 day range, the rapid decrease in dissolved oxygen prevents the commercial marketing of oxygen enriched drinking water in 3–5 gallon bulk bottles for use on standard water coolers.

It would, therefore, be highly desirable to provide a new and improved water cooler for dispensing oxygen enriched water wherein the dissolved oxygen content of water in the water bottle installed on the water cooler is maintained above about 50% of the original supersaturated level during the entire time water is dispensed from the water bottle by the cooler, i.e., during the entire usage cycle of the water bottle.

SUMMARY OF THE INVENTION

The present invention provides a new and improved water cooler and method of operating the same for dispensing oxygen enriched water from a water bottle installed on the cooler, the water having a dissolved oxygen content maintained optimally above about 50% of a supersaturated level previously established during bottling of the water. The supersaturated level established during bottling of the water is preferably about 80 mg/liter. Over the usage cycle of the bottled water, the dissolved oxygen content is maintained preferably above about 15 mg/liter, but optimally above about 40 mg/liter. A pressurized gas source combined with the water cooler delivers a gas through the water to a headspace in the water bottle above the water to maintain the dissolved oxygen content of water in the water bottle substantially above about 50% of the original supersaturated level during the entire time water is dispensed from the water bottle by the cooler. Without the pressurized gas, the oxygen content level would fall to about 5–9 mg/liter during the usage cycle of the water. The pressurized gas source preferably comprises a compressor mounted in the water cooler for providing pressurized air. Alternatively, the pressurized gas source can be of various other forms including stored air or gas in bottles. The gas can be other non-toxic gasses such as nitrogen, oxygen, etc.

Other features are included in the oxygenated water cooler to improve the operation and functionality of the water cooler. For instance, the water cooler of the present invention may include a control system including, for example, a pressure regulator and a pressure switch for automatically maintaining a desired gas pressure level in the headspace of the water bottle.

Alternatively, a water bottle may be placed on the cooler which has not been oxygen enriched. The oxygen may be added by, for example, injecting oxygen into the water just prior to exiting the spout.

BRIEF DESCRIPTION OF THE DRAWINGS

The foregoing and additional advantages and characterizing features of the present invention will become clearly apparent upon a reading of the ensuing detailed description together with the included drawings wherein.

DETAILED DESCRIPTION OF THE INVENTION

Figure 1:
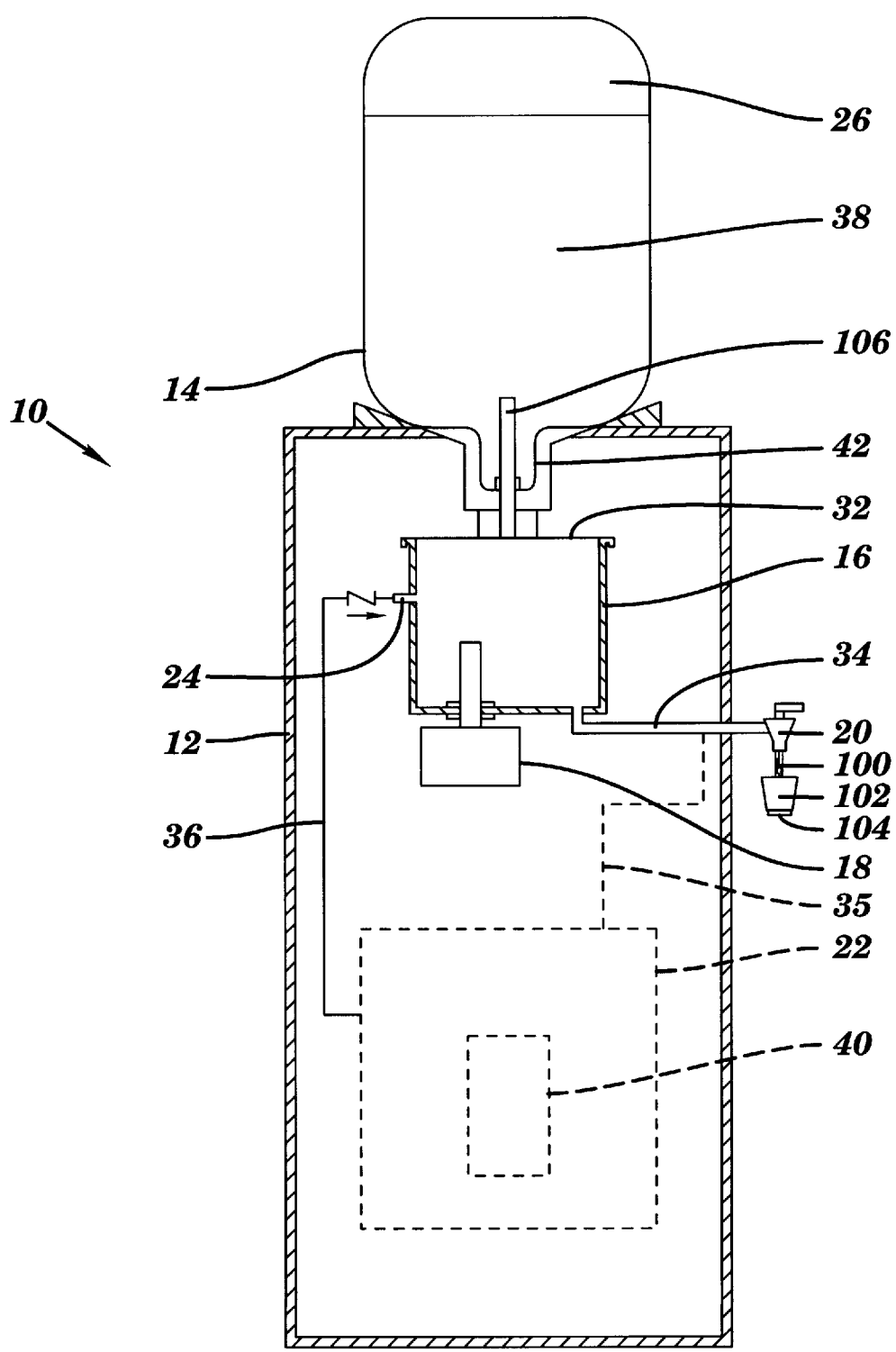
FIG. 1 is a diagrammatic view of an oxygenated water cooler in accordance with a preferred embodiment of the present invention.

As illustrated in FIG. 1, a water cooler 10 according to a first embodiment of the present invention includes an apparatus which maintains a pressure above atomspheric pressure in a headspace 26 in an inverted water bottle 14. The headspace 26 is located above the water 38 in the inverted water bottle 14 installed on the water cooler 10. The pressure in the headspace 26 is preferably above about 2 PSIG, but optimally above about 4 PSIG. The water bottle 14 typically is a five gallon bottle, but smaller size bottles can be employed. The water 38 in the water bottle 14 previously has been supersaturated with oxygen at a water purification and bottling plant or other source immediately prior to filling into the water bottle 14. The supersaturated oxygen level is about 80 mg/liter immediately after the water bottle 14 is filled at the bottling plant. Without pressurizing the headspace 26 with a gas, the level of oxygen in water in a standard prior art water cooler will drop to about 10 mg/liter within 3 to 5 days. In the present invention, the pressurized headspace 26 maintains the supersaturated oxygen level preferably above about 15 mg/liter, but optimally above about 40 mg/liter during the entire time that water 38 is dispensed from the water cooler 10.

The water cooler 10 according to a first embodiment of the present invention is shown in FIG. 1 and includes, briefly, a housing or enclosure 12 for receiving a water bottle 14 which is inverted and installed on housing 12, a water tank 16 within the housing 12 for receiving water from the water bottle 14, a refrigeration source 18 for cooling water in the water tank 16, a spigot 20 for dispensing water from the water tank 16, a pressurized gas source 22 preferably in the form of a compressor 40 within the housing 12, and means 24 for introducing pressurized gas from the pressurized gas source 22 through the water 38 in the water bottle 14 to the headspace 26 in the water bottle 14.

Considering the apparatus of FIG. 1 in more detail, the housing 12 preferably is of molded fiberglass construction but ultimately can be of other suitable materials such as wood or metal. The water bottle 14 is installed in the water cooler 10 by being placed in an inverted position on top of the cooler housing 12. The bottle cap 42 is pushed open and seals around a feed probe 106 which is attached to the top of the water tank 16. The water tank 16 is preferably constructed of stainless steel and has a cylindrical two piece design. The water tank lid 32 is removable to allow for cleaning and maintenance. A food grade gasket (not shown) seals the water tank lid 32 lid to the top of the water tank 16. The water tank lid 32 is held firmly fixed to the water tank 16 body with four locking clamps (not shown). The water tank 16 includes a tubing connection 24 (e.g., ⅛" tubing) in the sidewall for the supply of pressurized gas and a water outlet pipe connection 34 in the bottom. Alternatively, the tubing connection 24 can be located in the water tank lid 32. The water outlet pipe connection 34 is piped directly to the spigot 20. In this manner, the water bottle 14, feed probe 106, and water tank 16 form a single vessel that is pressurized at about 4 PSIG with pressurized gas supplied to the tubing connection 24 via conduit 36 from the pressurized gas source 22. As the oxygenated water is drawn from the water bottle 14 through the spigot 20, make-up gas flows into the water tank 16 and to the headspace 26 of the water bottle 14 from the pressurized gas source 22, thereby maintaining a positive pressure within the water bottle 14. The water in the water tank 16 and water bottle 14 thus serves as a conduit for transferring pressurized gas from the pressurized gas source 22 to the headspace 26 of the water bottle 14.

The pressurized gas source 22 is preferably in the form of a compressor 40 installed in the water cooler fiberglass enclosure 12. The pressurized gas source 22 may alternately comprise a pressurized gas cylinder. In either case, air is preferably delivered to the water tank 16 at a regulated pressure preferrably above about 2 PSIG, but optimally above about 4 PSIG. The pressurized gas source 22 may alternately provide a pressurized gas such as nitrogen, oxygen, etc.

The water tank 16 may be equipped with a refrigeration system 18 for maintaining the water dispensing temperature at or below about 50 F. The refrigeration system 18 may comprise a refrigerant compressor, condenser, and cooling coil, a thermoelectric device, or other refrigeration system. The water bottle 14 typically is 5 gallons in size and may be fabricated of either glass, a plastic resin (e.g., polycarbonate), or other suitable material that will contain the gas pressure. Regardless of material, the water bottle dimensions are generally similar.

Thus, the present invention integrates a pressurized gas source 22 into a water cooler 10 to maintain previously oxygenated water in bulk water bottles (e.g., 3–5 gallon) in a supersaturated state. The supersaturated state is maintained by controlling the gas pressure in the water bottle 14 headspace 26 at elevated levels throughout the usage cycle of the water bottle 14. In the present invention, the pressurized headspace 26 maintains the supersaturated oxygen level preferably above about 15 mg/liter, but optimally above about 40 mg/liter.

Figure 2:
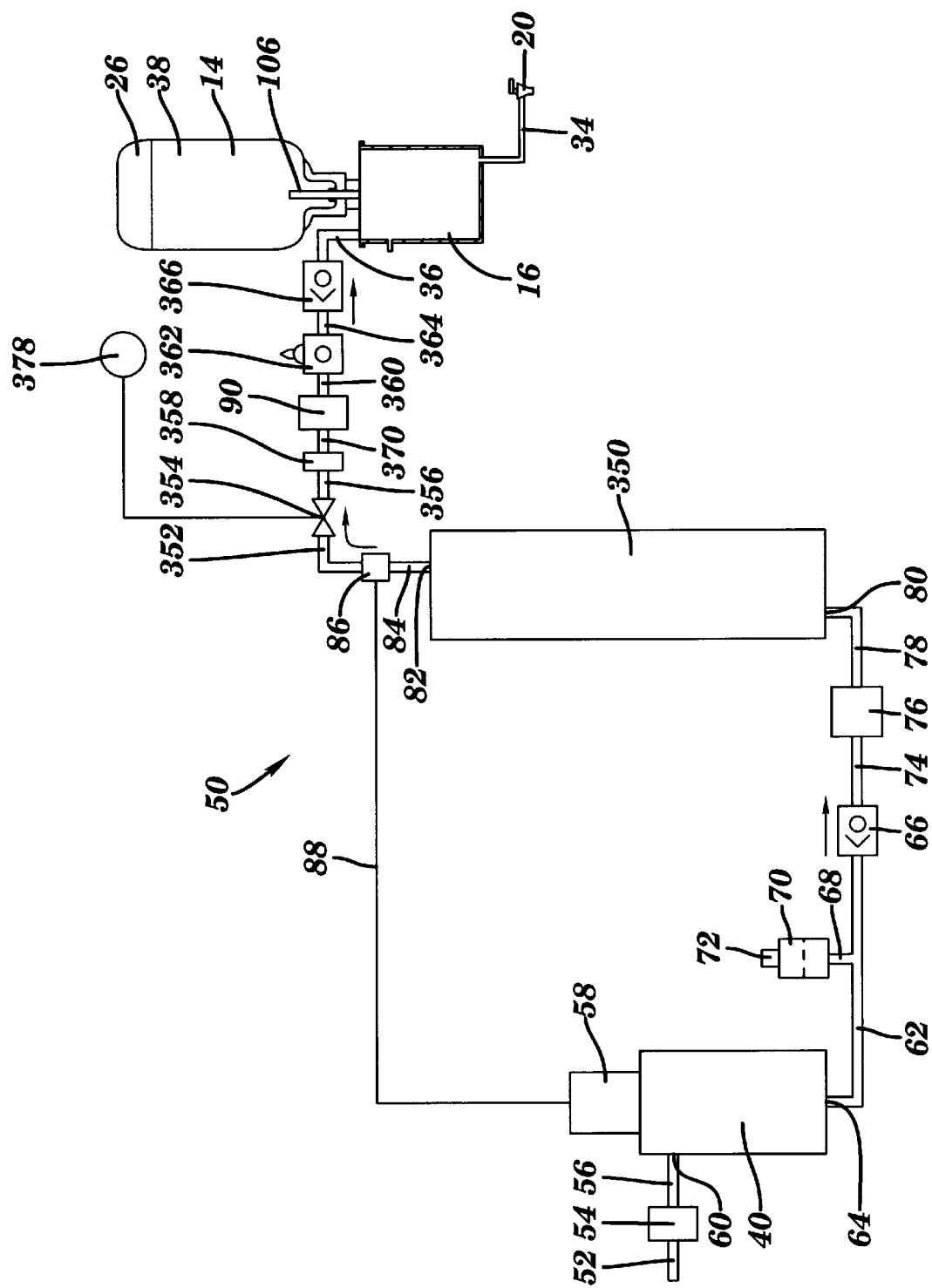
FIG. 2 is a diagrammatic view of a control system for providing pressurized gas in the water cooler according to a preferred embodiment of the present invention.

FIG. 2 illustrates a diagrammatic view of a control system 50 for providing pressurized gas to maintain a supersaturated oxygen level in the water 38 according to the present invention. Air enters an inlet conduit 52 and passes through a biofilter 54. The biofilter 54 purifies the air by removing bacteria from the air. From biofilter 54, the air passes through a conduit 56 and enters an inlet 60 of the compressor 40. A power supply 58 provides power to the compressor 40. The compressor 40 pressurizes the air from atmospheric pressure to about 23 PSIG. Sound deadening material (not shown), can surround the compressor 40 to eliminate noise caused by the compressor 40. A conduit 62 connects an outlet 64 of the compressor 40 to a check valve 66. A conduit 68 connects the conduit 62 with a flow restrictor 70. An outlet 72 of the flow restrictor 70 is open to the atmosphere. The flow restrictor 70 includes an orifice of about 0.010 inches in diameter. The flow restrictor 70 allows the compressed air in the conduit 62 to reduce to atmospheric pressure when the compressor 40 is turned off. A conduit 74 connects the check valve 66 with a coalescing filter 76. The check valve 66 allows pressurized air to flow from the compressor 40 to a pressure tank 350, and prevents pressurized gas from flowing from the pressure tank 350 back towards the compressor 40. The coalescing filter 76 removes moisture and particles from the air. A conduit 78 connects the coalescing filter 76 with an inlet 80 of the pressure tank 350.

According to a preferred embodiment of the present invention, the pressure tank 350 stores pressurized air at a pressure of about 23 PSIG. A conduit 84 connects an outlet 82 of the pressure tank 350 with a pressure switch 86. The pressure switch 86 is connected by an electrical signal cable 88 to the power supply 58 of the compressor 40. Signals to turn the compressor 40 on and off are sent through the electrical signal cable 88. The pressure switch 86 causes the compressor 40 to be turned on when the pressure in the pressure tank 350 falls to about 20 PSIG, and causes the compressor 40 to be turned off when the pressure in the pressure tank 350 reaches about 23 PSIG.

A conduit 352 connects the pressure switch 86 with a control valve 354. The control valve 354 is opened whenever power 378 is applied to the control valve 50. With control valve 354 opened, pressurized air can flow from the pressure tank 350 to the water tank 16. A conduit 356 connects the control valve 354 with a biofilter 358. The biofilter 358, filters bacteria from the air flowing toward the water tank 16. A conduit 370 connects the biofilter with a pressure regulator 90. The pressure regulator 90 maintains the pressure at about 4 PSIG in the water tank 16 and in the headspace 26. A conduit 360 connects the pressure regulator 90 with a pressure relief valve 362. The pressure relief valve 362 ensures that the air pressure in the water tank 16 and the headspace 26 does not exceed about 4 PSIG. A conduit 364 connects the pressure relief valve 362 with a check valve 366. The check valve 366 allows air to flow from the pressure tank 350 towards the water tank 16, and prevents air from flowing from the water tank 16 towards the pressure tank 350. The conduit 36 connects the check valve 366 with the water tank 16, allowing pressurized air to flow into the water tank 16.

Thus, as oxygenated water is drawn from the water bottle 14 through the spigot 20, pressurized make-up air flows into the water tank 16, through the probe 106 and water 38, into the headspace 26 of the water bottle 16. The control system 50 provides the pressurized air to the water tank 16.

In another embodiment of the present invention, the water 38 in the water bottle 14 is not previously supersaturated with oxygen. As illustrated in FIG. 1, the water bottle 14 is installed on the water cooler 10, and a pressurized gas (e.g., air, oxygen) is preferably delivered to the water tank 16 from the pressurized gas source 22. The control system 50 maintains a pressure in the water tank 16 and in the headspace 26 of the water bottle 14 at a regulated pressure preferably above about 2 PSIG, but optimally above about 4 PSIG. The pressurized gas passing through the water 38 to the headspace 26, increases the dissolved oxygen content in the water. Furthermore, the pressure of the gas in the water tank 16 and the headspace 26, results in the water 38 being projected in a jet 100 from the spigot 20. A cup 102 receives this jet 100, and the water strikes the bottom 104 of the cup 102 with a force causing agitation of the water 38. The agitation of the water 38 creates further oxygenation of the water 38 in the cup 102, before a person drinks the water 38.

In another embodiment of the present invention, the water 38 in the water bottle 14 is not previously supersaturated with oxygen. As illustrated in FIG. 1, the water bottle 14 is installed on the water cooler 10, and a pressurized gas (e.g., air, oxygen) is preferably delivered to the water tank 16 from the pressurized gas source 22. Additionally or alternatively, the pressurized gas may be delivered by a conduit 35 (shown in phantom) to the water outlet pipe connection 34 as illustrated in FIG. 1. For example, oxygen may be added to the water just prior to the spigot 20, without the need for keeping the water in the tank 16 or water bottle 14 oxygenated. The control system 50 maintains a pressure in the water tank 16 and in the headspace 26 of the water bottle 14 at a regulated pressure preferably above about 2 PSIG, but optimally above about 4 PSIG. The pressurized gas passing through the water 38 to the headspace 26, increases the dissolved oxygen content in the water. The dissolved oxygen content in the water is further increased by the atomization and mixing action caused by the pressurized gas injecting into the water in the water outlet pipe connection 34. Furthermore, the pressure of the gas in the water tank 16 and the headspace 26, results in the water 38 being projected in a jet 100 from the spigot 20. A cup 102 receives this jet 100, and the water strikes the bottom 104 of the cup 102 with a force causing agitation of the water 38. The agitation of the water 38 creates further oxygenation of the water 38 in the cup 102, before a person drinks the water 38.

The foregoing description of the present invention has been presented for purposes of illustration and description. It is not intended to be exhaustive or to limit the invention to the precise form disclosed, and many modifications and variations are possible in light of the above teaching. For example, the pressurized gas provided to the headspace 26 is not limited to air but can be any non-toxic gas such as nitrogen. Alternately, the pressurized gas can be provided from pressurized gas in a gas cylinder or from an external pressurized gas line or source. Furthermore, the pressurized gas supplied to the headspace 26 is preferably above about 2 PSIG, but optimally above about 4 PSIG, however, the pressure can be as high as the water bottle can safely contain. Such modifications and variations that may be apparent to a person skilled in the art are intended to be included within the scope of this invention as defined by the accompanying claims.

We claim:

1. A water cooler comprising:
   a water tank for receiving water from a water bottle;
   a system for dispensing water from the water tank;
   a refrigeration source for cooling water in the water tank;
   a pressurized gas source providing pressurized gas; and
   a system for introducing the pressurized gas from the pressurized gas source to increase the dissolved oxygen content in the water.

2. The water cooler according to claim 1, wherein the pressurized gas is air.

3. The water cooler according to claim 1, wherein the pressurized gas is oxygen.

4. The water cooler according to claim 1, further including a conduit carrying the pressurized gas from the pressurized gas source to a water outlet pipe connection to increase the dissolved oxygen content in the water.

5. A water cooler comprising:
   a water tank for receiving water from a water bottle containing water having a dissolved oxygen content at a supersaturated level;
   a system for dispensing water from the water tank;
   a refrigeration source for cooling water in the water tank;
   a pressurized gas source providing pressurized gas; and
   a system for introducing the pressurized gas from the pressurized gas source to maintain the dissolved oxygen content of the water in the water bottle at a supersaturated level.

6. The water cooler according to claim 5, wherein the water tank further includes a water tank lid for supporting the water bottle and for sealing water and oxygen in the water tank.

7. The water cooler according to claim 5, wherein the pressurized gas source comprises a gas compressor.

8. The water cooler according to claim 7, wherein the gas compressor is an air compressor.

9. The water cooler according to claim 5, wherein the pressurized gas source comprises a pressurized tank of gas.

10. The water cooler according to claim 5, wherein the pressurized gas source comprises a non-toxic gas.

11. The water cooler according to claim 5, wherein the pressurized gas source further includes a control system for maintaining air pressure in the headspace at a predetermined level above an atmospheric pressure.

12. The water cooler according to claim 5, wherein the pressurized gas source comprises:
    a compressor for producing pressurized air;
    a pressure tank for storing the pressurized air produced by the compressor; and
    a control system for controlling the operation of the gas source and for maintaining pressure in the headspace at a constant pressure level above atmospheric pressure.

13. The water cooler according to claim 12, wherein the control system further includes a pressure switch for actuating the pressure source in response to a predetermined reduction of pressure within the pressure tank.

14. An apparatus comprising:
    a water bottle containing water having a dissolved oxygen content at a supersaturated level;
    a system for dispensing water from the water bottle; and
    a system for introducing pressurized gas to a headspace above the water in the water bottle as water is dispensed by the dispensing system to maintain the dissolved oxygen content of the water at a supersaturated level.

15. The apparatus according to claim 14, wherein the dispensing system comprises a water cooler.

16. The apparatus according to claim 14, wherein the system for introducing pressurized gas includes an air compressor for suppling the pressurized gas.

17. The apparatus according to claim 14, wherein the system for introducing pressurized gas includes bottled gas for supplying the pressurized gas.

* * * * *